US007866513B2

(12) United States Patent
Leuliet et al.

(10) Patent No.: US 7,866,513 B2
(45) Date of Patent: Jan. 11, 2011

(54) LIQUID PRODUCT DISPENSING AND RECEIVING DEVICE

(75) Inventors: David Leuliet, Woincourt (FR); Francois Nicolle, Tourville la Chapelle (FR)

(73) Assignee: Rexam Dispensing Systems S.A.S. (FR)

( * ) Notice: Subject to any disclaimer, the term of this patent is extended or adjusted under 35 U.S.C. 154(b) by 15 days.

(21) Appl. No.: 11/942,821

(22) Filed: Nov. 20, 2007

(65) Prior Publication Data

US 2008/0116227 A1 May 22, 2008

Related U.S. Application Data

(63) Continuation of application No. PCT/FR2006/050228, filed on Mar. 14, 2006.

(30) Foreign Application Priority Data

May 20, 2005 (FR) .................................... 0551309

(51) Int. Cl.
*B65D 83/76* (2006.01)
*G01F 11/00* (2006.01)
*B05B 11/00* (2006.01)

(52) U.S. Cl. ................. 222/381; 222/321.7; 222/321.9; 222/383.1

(58) Field of Classification Search .............. 222/321.7, 222/321.9, 381, 383.1
See application file for complete search history.

(56) References Cited

U.S. PATENT DOCUMENTS 4,155,485 A * 5/1979 Spatz .......................... 222/381
4,249,681 A * 2/1981 French ........................ 222/381
4,343,417 A * 8/1982 Corsette ...................... 222/384
4,402,432 A * 9/1983 Corsette .................. 222/321.2
4,892,228 A * 1/1990 Yano ........................... 222/79
5,335,858 A * 8/1994 Dunning et al. ............. 239/333
5,492,252 A * 2/1996 Gueret ....................... 222/207
5,617,976 A * 4/1997 Gueret ....................... 222/380

(Continued)

FOREIGN PATENT DOCUMENTS

EP 0 796 804 9/1997

(Continued)

OTHER PUBLICATIONS

International Search Report, June 20, 2006, 2 pages.

*Primary Examiner*—Kenneth Bomberg
(74) *Attorney, Agent, or Firm*—St. Onge Steward Johnston & Reens LLC

(57) ABSTRACT

A device for dispensing and receiving a liquid or semi-liquid product via a metering chamber of a pump body. The device includes a piston which is fixably mounted in the pump body and is provided with an end sealingly engaged into the chamber. The piston end is provided with an elastically deformable membrane put thereon. The membrane includes a transversal wall forming an input check valve which is provided with a central supply orifice sealingly closable by a protruded element forming the check valve seat on the end of the piston. The membrane includes a fixing cylindrical skirt which is provided with at least one sealing peripheral lip slidingly contacting the internal wall of the chamber. The skirt forms a valve when it is deformed by contact with a projection bearing by the internal wall of the chamber in such a way that the air compressed by the piston is released into the chamber by the pump priming.

18 Claims, 4 Drawing Sheets

U.S. PATENT DOCUMENTS 5,655,688 A * 8/1997 Moore ..................... 222/321.2
6,070,763 A * 6/2000 Gueret ........................ 222/95

FOREIGN PATENT DOCUMENTS

EP 1 283 180 2/2003
EP 1 464 408 10/2004
FR 2 678 906 1/1993

* cited by examiner

LIQUID PRODUCT DISPENSING AND RECEIVING DEVICE

CROSS-REFERENCE TO RELATED APPLICATIONS

The present application is a continuation of pending International patent application PCT/FR2006/050228 filed on Mar. 14, 2006 which designates the United States and claims priority from French patent application 0551309 filed on May 20, 2005, the content of which is incorporated herein by reference.

FIELD OF THE INVENTION

The invention relates to a device for dispensing and intaking a liquid or semi-liquid product, preferably pharmaceutical or cosmetic, by means of a dosage chamber of a pump body.

BACKGROUND OF THE INVENTION

Such devices are usually designed for dispensing measured amounts of a liquid product, and for watertight sealing of the neck of a bottle containing said liquid product to be dispensed.

Devices of this type exist forming a pump and comprising a pump body, a piston mounted fixed in the pump body, a dosage chamber with variable volume into which the end of the piston opens, the chamber communicating with the outside by means of a release valve enclosed in a push button, allowing a dose of product to be dispensed when it is pressed. In addition, the end of the piston is closed by a valve or a second valve for intaking the liquid product in the chamber.

Such devices have certain disadvantages, in particular in the pharmaceutical field, since the doses of product dispensed can vary from one spray to the next, while the dispensing of accurate doses is required.

Furthermore, when such devices are implemented on bottles without air intake, for example with deformable walls, the pump must have sufficient suction power to reduce the volume of the container. This demand is difficult to meet, which can affect the precision of the doses of product dispensed.

Moreover, such devices are very sensitive and their reliability is not always guaranteed. The manufacturer must ensure that the elements forming the pump are centred and aligned around the axis of symmetry of said pump, at the risk of malfunctions that can result in incomplete doses and/or reduced suction power. In addition, when activating the pump, the user must make sure to press the centre of the push button, in order not to cause the compression elements to move off centre and to avoid breaking the seal between the valve and the dosage chamber.

Furthermore, the known devices entail problems when priming the pump. Indeed, due to their design, it is difficult to vent the air contained in the dosage chamber before using the dispenser for the first time.

SUMMARY OF THE INVENTION

The present invention makes it possible to solve the disadvantages of such pumps.

It relates in particular to a device designed to be installed independently on a bottle with varying capacity, which is to say a flexible bottle, or deformable bag, or on a bottle with a mobile scraper, or on a rigid bottle with constant capacity, requiring an air intake or not.

The device according to the invention comprises a piston which is mounted fixed in the pump body and which has one end engaged in a watertight manner in the chamber, the end of the piston being covered by an elastically deformable membrane.

According to the invention, the membrane comprises:

- on the one hand, a transversal wall forming an intake valve being provided with a central supply orifice, capable of being blocked in a watertight manner by a projecting element forming a valve seat on the end of the piston, and
- on the other hand, a cylindrical attachment skirt equipped with at least one sealing peripheral lip in sliding contact with the inner wall of the chamber;
- the skirt forming a valve by deformation in contact with a boss provided on the inner wall of the chamber, for releasing the air compressed by the piston in the chamber when priming the pump.

Thus manufactured, the device according to the invention guarantees the venting of the air contained in the chamber, which allows the pump to be primed before its first use.

According to a first embodiment of the device according to the invention, the boss consists of at least one axial rib projecting from the inner wall of the chamber.

In order to improve the watertightness, the bottom face of the transversal wall of the membrane advantageously comprises an annular pad centred on the central orifice, and coming to rest against the projecting element of the end of the piston in the valve closing position.

According to one advantageous alternative embodiment, the device according to the invention comprises an element for connecting the piston to the pump body, equipped with a bearing for retaining the membrane.

Moreover, according to another alternative embodiment, the retaining bearing comprises means for snap-fitting the skirt of the membrane. The snap-fitting means preferably consist of a peripheral groove, made in the lateral wall of the element and cooperating with a snap-fitting bead provided on the inner wall of the skirt.

According to a further alternative embodiment, the connection element is an independent part, designed to be added to the bottom part of the pump body.

According to yet another alternative embodiment, the connection element comprises a transversal wall forming a bottom, designed to block the body at the bottom.

It is advantageously provided for the connection element to comprise a cylindrical bore in which a product intake tube is inserted.

The connection element preferably comprises an axial supply conduit, communicating at the bottom with the cylindrical bore.

Moreover, it is advantageously provided for the connection element to comprise a peripheral shoulder against which the bottom edge of the skirt of the membrane comes to a stop.

It is advantageously provided for the watertight peripheral lip to be made in the proximity of the peripheral shoulder. This makes it possible to improve the watertightness of the device by limiting any radial movement of the membrane, which can offset the projecting element in relation to the central orifice of the membrane.

According to yet another embodiment, the device according to the invention comprises an expansion cavity in which the projecting element of the end of the piston is inserted. This cavity is hermetically sealed at the bottom by the projecting element and at the top by the membrane.

Finally, it is advantageously provided for the projecting element to consist of a ball mobile between a valve closing position and an opening position in which it allows the liquid product to enter the chamber.

The device according to the invention preferably comprises elements for centring the projecting element in the axis of the intake orifice.

Thus manufactured, the device according to the invention guarantees not only easy and quick priming of the pump before its first use, but also a perfect seal between the end of the piston and the dosage chamber, regardless of the pressing force and the manner in which the users exerts this force on the push button, or of the area of the push button which the user presses to activate the pump.

The device of the invention has a particularly useful application in the field of pump sprayers in which the spray cooperates with a valve having an end needle valve.

BRIEF DESCRIPTION OF THE DRAWINGS

Further objectives and advantages of the invention will become apparent from the following description made in reference to FIGS. 1 to 8, wherein.

DETAILED DESCRIPTION OF THE INVENTION

The device described below is particularly suitable for dispensing a pharmaceutical product, such as a medicine, contained in a bottle container.

It should, however, be understood that the device according to the invention does not only apply to dispensing a pharmaceutical product, and that it relates to any device corresponding to the definition of the invention capable of being used in any type of pump body.

For this purpose, two embodiments of the device according to the invention are presented below.

Figure 1:
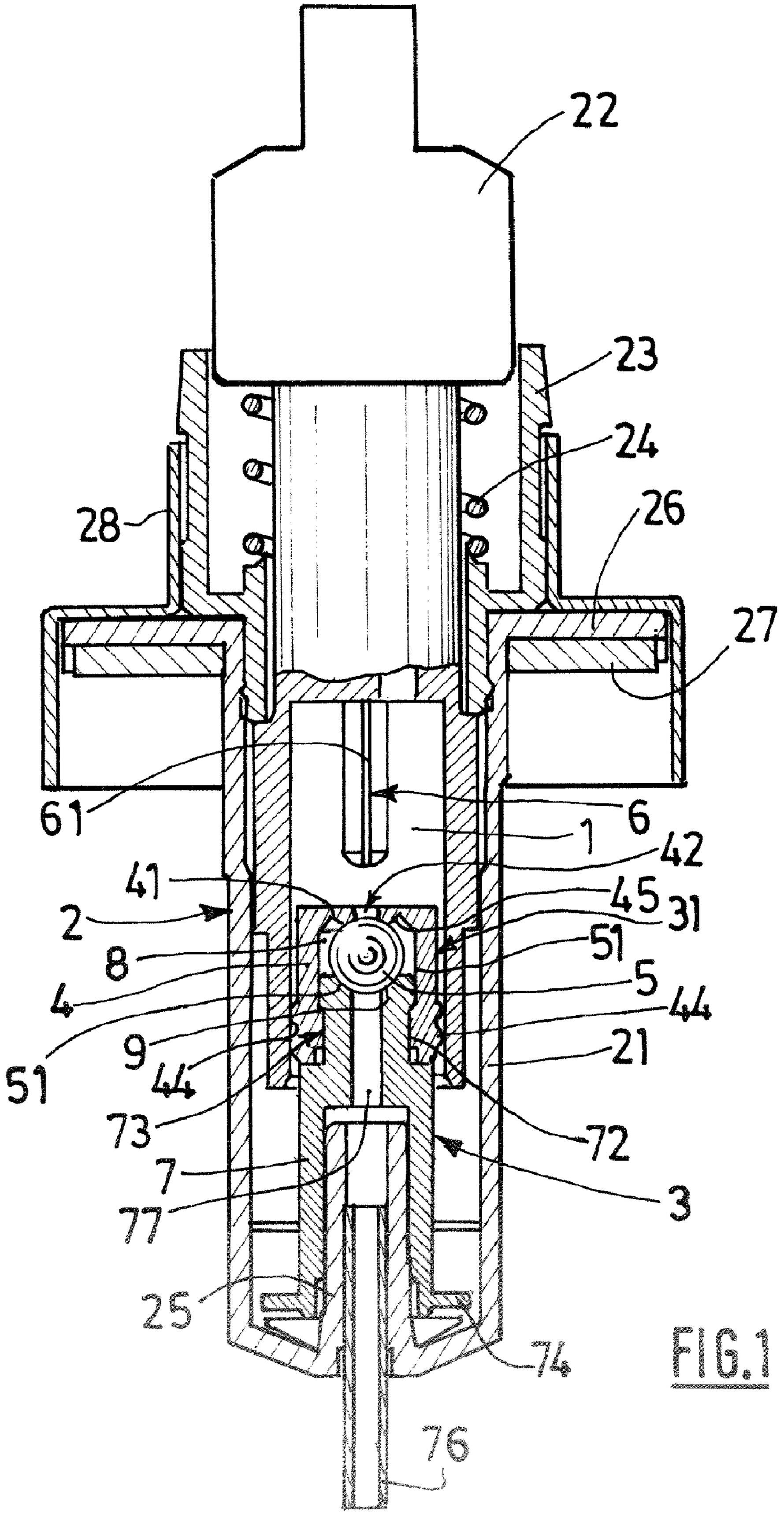
FIG. 1 shows, in a partial section view, a device according to the invention mounted in a pump.

FIG. 1 depicts a first embodiment of the device according to the invention, and FIGS. 3 to 8 depict a second embodiment.

Regardless of the embodiment shown in the figures, the device according to the invention is designed for dispensing a dose of liquid or semi-liquid product, via a dosage chamber 1 of a pump body 2.

In a standard manner, as shown in FIG. 1 for example, the pump body 2 comprises a hollow cylinder 21 with dimensions allowing it to accommodate the device according to the invention.

The hollow cylinder 21 is open at a first end to accommodate an exhaust system, not shown in detail in the figures, which is equipped in particular with a push button 22 and which comprises the dosage chamber 1.

The push button 22 is mounted mobile between a pressed position and a released inactive position in a guiding sleeve 23 assembled in the hollow cylinder 21 of the pump body 2.

A compression spring 24 in the sleeve provides, in this case, the elastic return of the push button 22 from its pressed position to its inactive position.

The first end of the hollow cylinder 21 comprises a flange 26 for hooking on the neck of the bottle container. It is possible to provide an annular seal 27, under the hooking flange 26, to guarantee the seal with the neck of the bottle. Moreover, an outer girder 28 makes it possible in this case to crimp the pump on the bottle container.

In order to facilitate the understanding of the figures, neither the bottle container nor the liquid product are shown.

A second end of the cylinder 21 of the pump body is closed around a conduit 25 providing the connection for the end of an intake tube 76 of a liquid product contained in the bottle container on which the pump is mounted.

As shown in FIG. 1, the device according to the invention, which is mounted in the pump body 2, comprises in particular a piston 3.

The piston 3 which is mounted fixed in the bottom of the pump body 2, comprises a top end 31 inserted in a watertight manner in the chamber 1.

Figure 2:
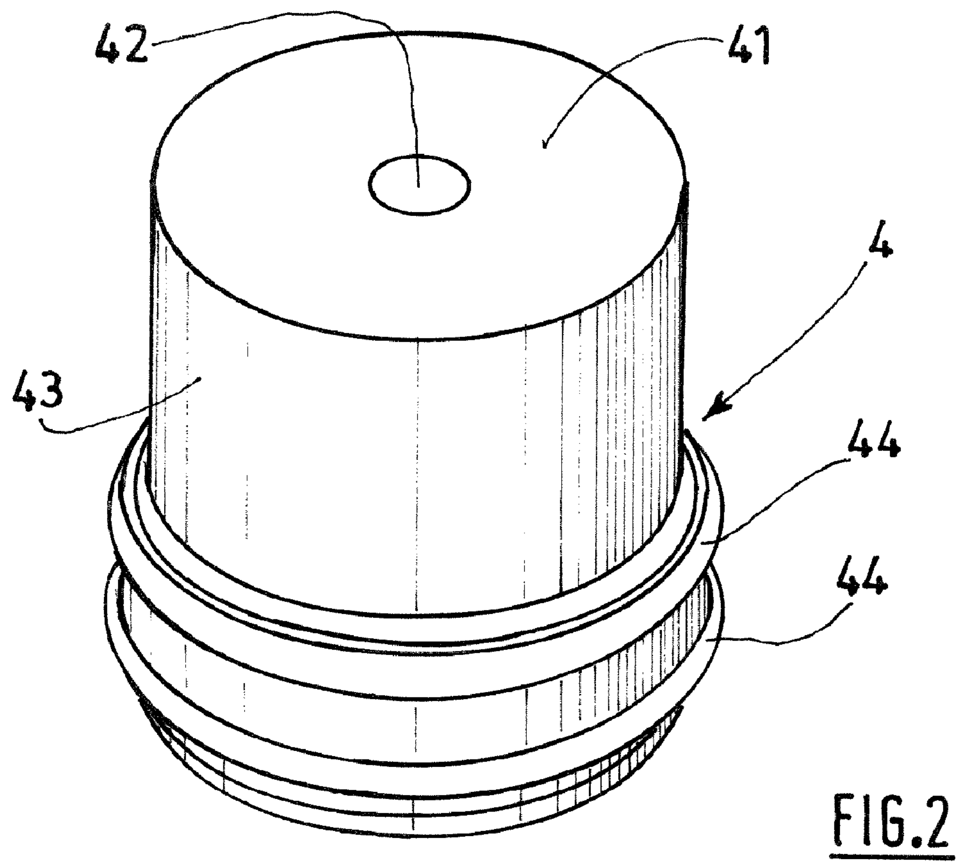
FIG. 2 depicts an embodiment of a membrane which comprises a device according to the invention, in a profile view.

The end 31 of the piston is covered by an at least partially elastically deformable membrane 4, which is more particularly shown in FIG. 2.

Figure 3:
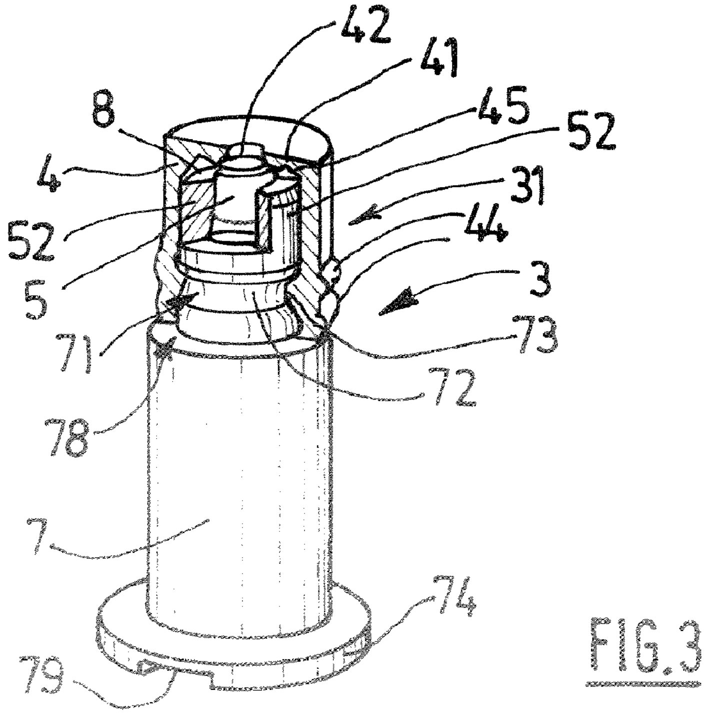
FIG. 3 shows a second embodiment of the device according to the invention, in a profile view, the membrane being shown partially in order to illustrate various elements of the device according to the invention.

The membrane 4 comprises, on the one hand, a deformable transversal wall 41 forming an intake valve being provided with a central supply orifice 42, capable of being blocked in a watertight manner by a projecting element 5 forming a valve seat on the end of the piston 3 (see FIG. 3).

On the other hand, the membrane 4 comprises a cylindrical attachment skirt 43, provided with at least one and in this case two peripheral sealing lips 44, in sliding contact with the inner wall of the chamber 1.

Where applicable, the skirt 43 can be made from a different material which is more rigid than that of the wall 41.

It is provided for the peripheral lips to be made at the bottom of the cylindrical skirt of the membrane, in order to guarantee an optimum seal which is explained in greater detail below.

The membrane 4 allows the introduction of a liquid product in the dosage chamber 1, when a depression is created in this chamber 1. Indeed, the deformable nature of its wall 41 allows it to lift, separating from the projecting element under the pressure of the liquid, unblocking the orifice 42 and thus allowing the liquid to penetrate into the dosage chamber.

According to the invention, the skirt 43 forms a valve by deformation of at least the lips 44 in contact with a boss 6 provided on the inner wall of the chamber 1, for releasing the air compressed by said piston 3 in the chamber 1 when priming the pump.

As shown in FIG. 1, the boss consists in this case of at least one axial rib 6 projecting on the inner wall of the chamber 1.

The axial rib 6 comprises a channel 61 which is longitudinal and has a very narrow cross-section, allowing the passage of the air expelled from the dosage chamber 1 when priming the pump.

Figure 4:
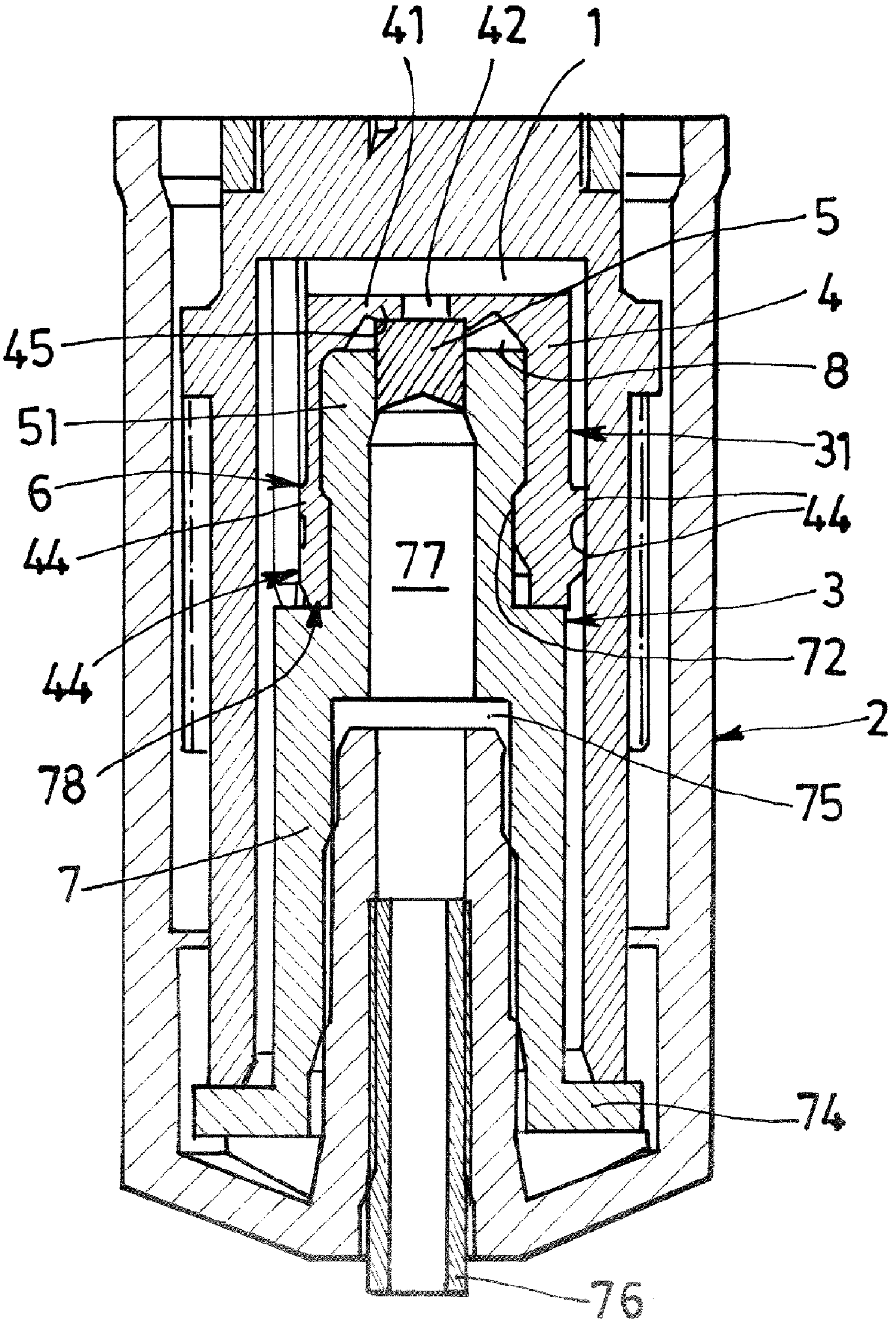
FIG. 4 shows, in a section view, the device shown in FIG. 3 mounted in a pump body, at the time of priming the pump.

FIG. 4 shows, in particular, the shape taken on by the membrane 4 when the piston 3 is pressed into the dosage chamber.

It is noted that the rib 6 crushes the sealing lips 44 without breaking the seal of the liquid product. Indeed, the supporting contact between the groove 6 and the lips 44 does not create a passage for the liquid. Only the channel 61 forming a capillary guarantees the release of the air compressed during the initial phase of priming the pump, said release taking place by passing around the sealing lips 44 and towards the outside of the chamber 1.

In order to improve the watertightness of the intake valve between the membrane 4 and the end of the piston, the bottom face of the transversal wall 41 comprises an annular pad 45 centred on said central orifice 42, and coming to rest against the projecting element 5.

As shown more particularly in FIG. 3, in a partial section view, the device according to the invention comprises an element 7 guaranteeing the connection of the piston 3 to the pump body 2.

The connection element 7 is provided with a bearing 71 for retaining the membrane 4.

The retaining bearing 71 comprises means for snap-fitting the skirt 43 of the membrane 4. These snap-fitting means consist of a peripheral groove 72, made in the lateral wall of the element 7 and cooperating with a snap-fitting bead 73 provided on the inner wall of the skirt 43.

The connection element 7 in this case is made as a separate part from the pump body 2, which is designed to be inserted through the top opening and accommodated in the bottom part of said body.

The connection element 7 comprises a base 74 made in the shape of a disc, which guarantees the positioning and coaxial setting of the element.

It is provided to make at least one radial recess 79 in the thickness of the disc, cooperating with a rivet (not shown in the figures) projecting from the bottom of the pump body, which prevents all rotation of said device according to the invention when the latter is correctly arranged on the bottom of the pump body.

It should be understood that, according to one variation, not shown, the connection element 7 can be added to the bottom part of the pump body 2, so that the transversal wall 74 forms a bottom blocking said body 2 at the bottom.

Figure 5:
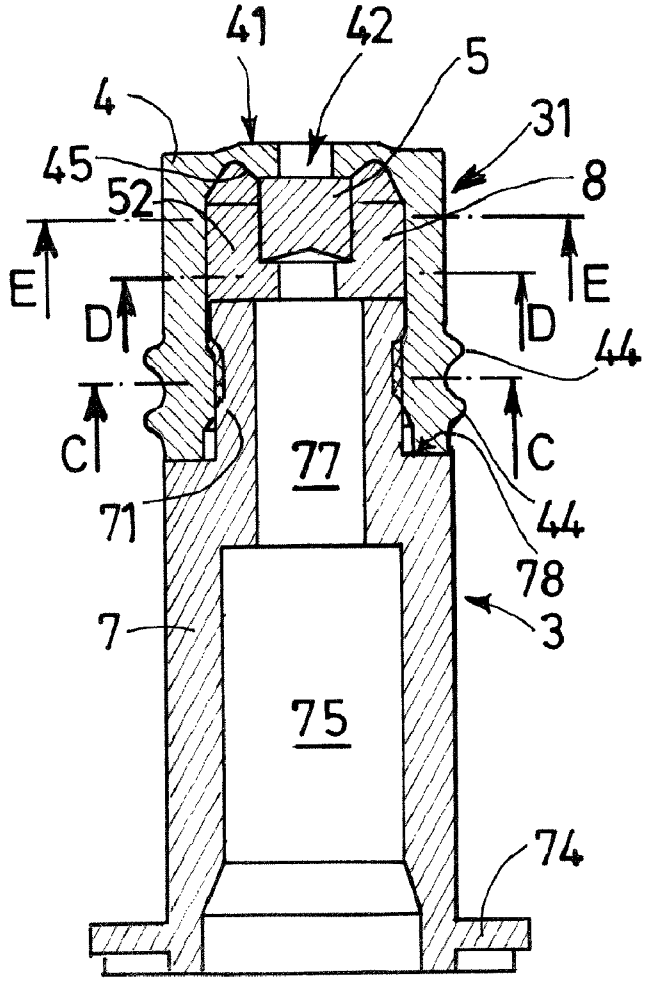
FIG. 5 shows, in a section view, the device of FIGS. 3 and 4 before priming the pump.

As can be seen in FIG. 5 in particular, the connection element 7 comprises, at the bottom, a cylindrical bore 75 in which the tube 76 for intaking the liquid product is inserted (FIGS. 1 and 4).

Moreover, the connection element 7 comprises, at the top, an internal conduit 77 for supplying the product to the chamber 1, the supply conduit communicating with the cylindrical bore 75 (FIGS. 1, 4 and 5).

As shown in FIGS. 4 and 5, the connection element 7 also comprises a peripheral shoulder 78 against which the bottom edge of the skirt 43 of the membrane 4 comes to a stop.

As can be seen in particular in FIG. 3, an expansion cavity 8 is provided on the end of the piston 3 under the membrane 4, the cavity 8 being hermetically sealed by the projecting element 5 and by the membrane 4.

The liquid product is introduced in this cavity before penetrating into the dosage chamber 1.

As can be seen in the figures, the projecting element 5 of the end of the piston 3 is inserted in the cavity 8.

According to the first embodiment shown in FIG. 1, the projecting element 5 consists of a mobile ball 5 resting between centring elements 51 in the valve closing position.

As can be seen in FIG. 1, the top end of the supply conduit 77 is made to form a race 9 (FIG. 1) in the shape of a truncated cone, providing support and centring of the ball 5.

According to this embodiment, in the valve closing position, the ball blocks both the end of the supply conduit 77 and the orifice of the membrane 4. It is thus immobilised between the race and the membrane. Thus, the ball prevents any liquid from entering the cavity 8, and any liquid from entering the dosage chamber.

According to another embodiment shown, for example in FIG. 4 or 5, the top end of the connection element 7 comprises slots delimited in this case by two tabs 52 provided on the bearing 71, designed to extend the conduit 77. The tabs 52 maintain the projecting element 5 centred in the axis of the conduit 77 and at a distance from its end. The projecting element 5 is thus presented in the shape of a full cylinder with a diameter that is substantially equal to or slightly greater than, the distance separating the two tabs 52, so that the projecting element is immobilised between the two tabs 52.

According to this embodiment, even if the projecting element 5 only blocks the orifice of the membrane, the liquid can enter the expansion cavity 8.

The cavity 8 can thus be used as a chamber for treating the liquid product. For this purpose, it is possible to insert a chemical or biological agent in such cavity, with which the liquid product can interact by mutual contact or dispersion. This agent can be contained in the material forming the projecting element 5 or on the walls of the cavity 8.

Figure 6:
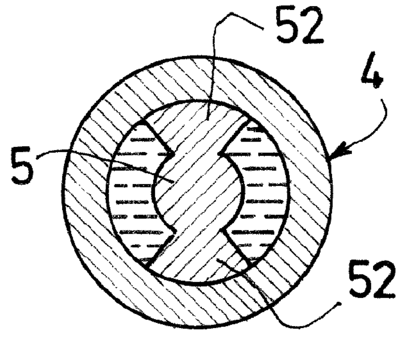
FIG. 6 is a section view of the device of FIG. 5 according to the plane E-E shown in FIG. 5.
Figure 7:
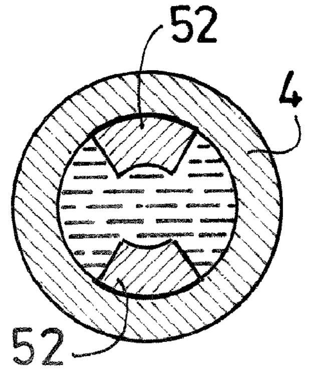
FIG. 7 is a section view of the device of FIG. 5 according to the plane D-D shown in FIG. 5.
Figure 8:
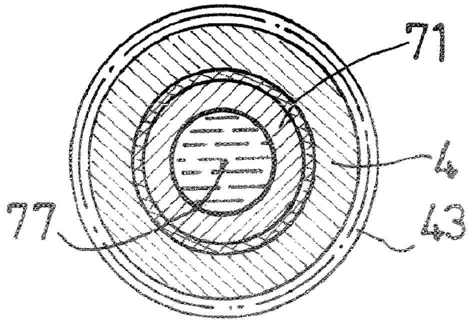
FIG. 8 is a section view of the device of FIG. 5 according to the plane C-C shown in FIG. 5.

In order better to visualise the space filled by the liquid in the valve closing position, FIGS. 6 to 8 each show section views of the end of the piston according to several transversal planes. These figures each depict the zones filled by the liquid when the projecting element 5 blocks the orifice 42 of the membrane 4.

FIG. 8 is a section view according to the plane C-C shown in FIG. 5. FIG. 8 shows the liquid (in grey) filling the supply conduit 77.

FIG. 7 is a section view according to the plane D-D shown in FIG. 5. This figure shows that the liquid fills the entire free volume of the cavity 8 located under the projecting element 5 and on either side of the projecting element 5, between the centring tabs 52.

Finally, FIG. 6 is a section view according to the plane E-E shown in FIG. 5. This figure shows that the liquid fills the entire free volume of the cavity 8 located on either side of the projecting element 5, between the centring tabs 52.

The centring tabs 52 guarantee that the projecting element 5 is always centred on the axis of the supply conduit 77, and also on the axis of the orifice 42, to guarantee a regular flow of the liquid and optimum watertightness at the level of the orifice 42 of the membrane 4.

Moreover, the actual position of the peripheral sealing lips 44 on the skirt 43 of the membrane 4 reinforces the sealing capacity of the membrane. Indeed, the closer these lips 44 are to the shoulder, the smaller the risk of the membrane 4 moving and being offset in relation to the axis of the supply conduit.

Also, maximum watertightness is guaranteed by the combination of the sealing lips 44 positioned near the shoulder 78, on the one hand, and the centring elements 51 (or 52) of the projecting element 5 forming a valve seat on the end of the piston, on the other hand.

The preceding description clearly explains how the invention makes it possible to guarantee the watertightness at the intake of the dosage chamber, by guaranteeing the radial setting of the membrane 4 when a user presses the push button of the pump.

In addition, the preceding description clearly describes the means providing the venting of the air contained in the dosage chamber when priming the pump.

An advantageous combination of these typical characteristics of the device according to the invention offers the pharmaceutical and/or cosmetic industry a pump:

- that dispenses accurate doses of a liquid product, thanks to the improved watertightness between the membrane and the dosage chamber when the pump is not being used; and
- which is easily primed thanks to the means implemented to vent the air contained in the dosage chamber before a first use.

What is claimed is:

1. Device for dispensing and intaking a liquid or semi-liquid product by means of a dosage chamber of a pump body, said device comprising a piston which is mounted fixed in the pump body, said piston comprising one end inserted in a watertight manner in said chamber, the end of the piston being covered with an elastically deformable membrane, characterised in that said membrane comprises an elastically deformable transversal wall having an at least partially flat top face extending across the end of the piston, the transversal wall forming an intake valve being provided with a central supply orifice extending through the transversal wall, and an elastically deformable cylindrical attachment skirt equipped with at least one sealing peripheral lip in sliding contact with an inner wall of the chamber, wherein the sealing peripheral lip of the elastically deformable cylindrical attachment skirt is pressed between the inner wall of the chamber and an outer wall of the piston, wherein said device further comprises a projecting element forming a valve seat on the end of the piston for blocking the central supply orifice in a watertight manner on a bottom face of the transversal wall, and wherein said device comprises a connection element wholly within the pump body for connecting said piston to said pump body, wherein said connection element is an independent part from said membrane and said pump body and is connected to a bottom part of said pump body over a conduit extending up from the bottom part of said pump body.

2. Device according to claim 1, characterised in that it comprises elements for centring the projecting element in the axis of said supply orifice.

3. Device according to claim 1, characterised in that the bottom face of the transversal wall of said membrane comprises an annular pad centred on said central orifice, and coming to rest against said projecting element in a valve closing position.

4. Device according to claim 1, characterised in that said connection element is equipped with a bearing for retaining said membrane.

5. Device according to claim 4, characterised in that said retaining bearing comprises means for snap-fitting the skirt of said membrane.

6. Device according to claim 5, characterised in that the snap-fitting means consist of a peripheral groove, made in the lateral wall of said element and cooperating with a snap-fitting bead provided on the inner wall of the skirt.

7. Device according to claim 1, characterised in that said connection element comprises a base in the shape of a disc.

8. Device according to claim 1, characterised in that said connection element comprises a cylindrical bore in which a tube for intaking said product is inserted.

9. Device according to claim 8, characterised in that said retaining bearing of the connection element comprises an axial supply conduit, communicating at the bottom with the cylindrical bore.

10. Device according to claim 1, characterised in that said connection element comprises a peripheral shoulder against which the bottom edge of said skirt of said membrane comes to a stop.

11. Device according to claim 10, characterised in that said peripheral sealing lip is provided in the proximity of said peripheral shoulder.

12. Device according to claim 1, characterised in that it comprises an expansion cavity in which the projecting element of the end of the piston is inserted.

13. Device according to claim 1, wherein the outer wall is an outer wall of an element for connecting said piston to said pump body.

14. Device according to claim 1, wherein the top surface of the transversal wall is substantially flat.

15. Device for dispensing and intakinq a liquid or semi-liquid product by means of a dosage chamber of a pump body, said device comprising a piston which is mounted fixed in the pump body, said piston comprising one end inserted in a watertight manner in said chamber, the end of the piston being covered with an elastically deformable membrane, characterised in that said membrane comprises an elastically deformable transversal wall having an at least partially flat top face extending across the end of the piston, the transversal wall forming an intake valve being provided with a central supply orifice extending through the transversal wall, and an elastically deformable cylindrical attachment skirt equipped with at least one sealing peripheral lip in sliding contact with an inner wall of the chamber, wherein the sealing peripheral lip of the elastically deformable cylindrical attachment skirt is pressed between the inner wall of the chamber and an outer wall of the piston, wherein said device further comprises a projecting element forming a valve seat on the end of the piston for blocking the central supply orifice in a watertight manner on a bottom face of the transversal wall, and characterised in that the projecting element consists of a ball mobile between a valve closing position and an opening position in which it allows the liquid product to enter said chamber.

16. Device according to claim 15, characterised in that it comprises an element for connecting said piston to said pump body, said connection element being is equipped with a bearing for retaining said membrane, further characterised in that said connection element is an independent part, designed to be added to a bottom part of said pump body.

17. Device according to claim 15, wherein, in the valve closed position, the projecting element forms a seal against both the central supply orifice of the transversal wall and a top end of a supply conduit.

18. The device according to claim 17, further comprising an expansion cavity in which the projecting element is inserted, wherein in the valve closed position the projecting element prevents any liquid from entering the expansion cavity and any liquid from entering the dosage chamber.

* * * * *